(12) United States Patent
Hiruta et al.

(10) Patent No.: US 8,727,378 B2
(45) Date of Patent: May 20, 2014

(54) AIR BAG AND AIR BAG DEVICE

(75) Inventors: Teruhiko Hiruta, Tokyo (JP); Mitsuo Maruoka, Tokyo (JP); Makoto Ogawa, Tokyo (JP); Yoshihiro Kobayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/883,220

(22) PCT Filed: Nov. 2, 2011

(86) PCT No.: PCT/JP2011/075291
§ 371 (c)(1),
(2), (4) Date: May 2, 2013

(87) PCT Pub. No.: WO2012/060408
PCT Pub. Date: May 10, 2012

(65) Prior Publication Data
US 2013/0221638 A1    Aug. 29, 2013

(30) Foreign Application Priority Data
Nov. 4, 2010   (JP) ................... 2010-247253

(51) Int. Cl.
*B60R 21/203*   (2006.01)
*B60R 21/2338*  (2011.01)
*B60R 21/2342*  (2011.01)
*B60R 21/239*   (2006.01)

(52) U.S. Cl.
CPC ........... *B60R 21/203* (2013.01); *B60R 21/2338* (2013.01); *B60R 21/239* (2013.01); *B60R 21/2342* (2013.01); *B60R 2021/23382* (2013.01); *B60R 2021/2395* (2013.01)
USPC .......... 280/743.2; 280/739; 280/742

(58) Field of Classification Search
CPC .......... B60R 21/2338; B60R 2021/23382; B60R 21/2342; B60R 21/239; B60R 2021/2395; B60R 21/203
USPC ................ 280/743.2, 739, 742
See application file for complete search history.

(56) References Cited

U.S. PATENT DOCUMENTS 5,489,119 A  *  2/1996  Prescaro et al. .......... 280/743.2
5,871,231 A     2/1999  Richards et al.
(Continued)

FOREIGN PATENT DOCUMENTS

JP    01-125753     8/1989
JP    03-067748 A   3/1991
(Continued)

OTHER PUBLICATIONS

International Search Report and Written Opinion; PCT/JP2011/075291; issued Feb. 21, 2013; 10 pages.

*Primary Examiner* — Faye M Fleming
*Assistant Examiner* — Joselynn Y Sliteris
(74) *Attorney, Agent, or Firm* — Foley & Lardner LLP

(57) ABSTRACT

In an air bag main body which inflates step by step in a first stage and a second stage by bonding its peripheral edge portion and bonding its inner side than the peripheral edge portion, a connecting member bridging between a lid member opening and closing a vent hole and a coupling member can be always set to a tension state by arranging an adjusting portion in the coupling member which defining a maximum facing distance between a front panel and a rear panel in the tension state in each of the first stage and the second stage, and whereby a closed state of the vent hole can be maintained.

3 Claims, 9 Drawing Sheets

(56) References Cited

U.S. PATENT DOCUMENTS

| | | | |
|---|---|---|---|
| 5,979,937 A | 11/1999 | Yoshida et al. | |
| 6,773,030 B2 * | 8/2004 | Fischer | 280/739 |
| 7,039,854 B1 * | 5/2006 | Ireland et al. | 714/785 |
| 7,134,691 B2 * | 11/2006 | Dunkle et al. | 280/743.2 |
| 7,380,822 B2 * | 6/2008 | Abe | 280/743.1 |
| 7,607,690 B2 * | 10/2009 | Abe et al. | 280/739 |
| 7,726,685 B2 * | 6/2010 | Abe et al. | 280/736 |
| 7,954,850 B2 * | 6/2011 | Fischer et al. | 280/743.1 |
| 8,262,130 B2 * | 9/2012 | Fischer et al. | 280/743.2 |
| 8,419,054 B2 * | 4/2013 | Abe | 280/739 |
| 8,419,058 B2 * | 4/2013 | Fischer et al. | 280/743.2 |
| 8,434,786 B2 * | 5/2013 | Jang et al. | 280/743.2 |
| 2005/0225065 A1 | 10/2005 | Fujll | |
| 2007/0045997 A1 | 3/2007 | Abe et al. | |
| 2009/0020991 A1 | 1/2009 | Abe et al. | |
| 2009/0121461 A1 | 5/2009 | Abe et al. | |
| 2009/0206587 A1 | 8/2009 | Abe | |
| 2009/0236836 A1 | 9/2009 | Abe et al. | |
| 2011/0101652 A1 | 5/2011 | Abe | |

FOREIGN PATENT DOCUMENTS

| | | |
|---|---|---|
| JP | 03-136943 A | 6/1991 |
| JP | 07-329665 A | 12/1995 |
| JP | 08-119052 A | 5/1996 |
| JP | 09-188217 A | 7/1997 |
| JP | 09-263206 A | 10/1997 |
| JP | 09-272389 A | 10/1997 |
| JP | 2000-511848 A | 9/2000 |
| JP | 2003-276554 A | 10/2003 |
| JP | 2005-153726 A | 6/2005 |
| JP | 2005-297715 A | 10/2005 |
| JP | 2007-099122 A | 4/2007 |
| JP | 2007-216943 A | 8/2007 |
| JP | 2007-331541 A | 12/2007 |
| JP | 2008-056175 A | 3/2008 |
| JP | 2008-189143 A | 8/2008 |
| JP | 2009-040260 A | 2/2009 |
| JP | 2009-113757 A | 5/2009 |
| JP | 2010-173620 A | 8/2010 |
| JP | 2010-173621 A | 8/2010 |
| WO | WO-2007/088961 A1 | 8/2007 |

* cited by examiner

FIG. 5A
FIG. 5B
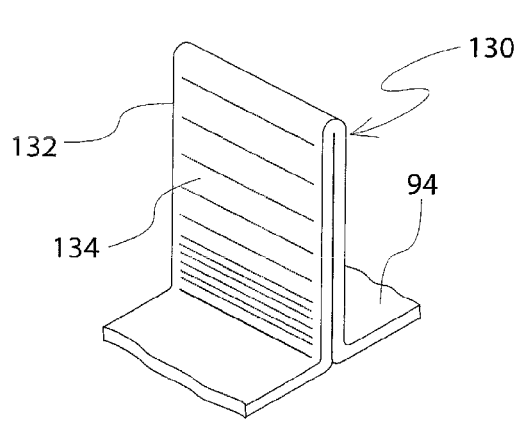
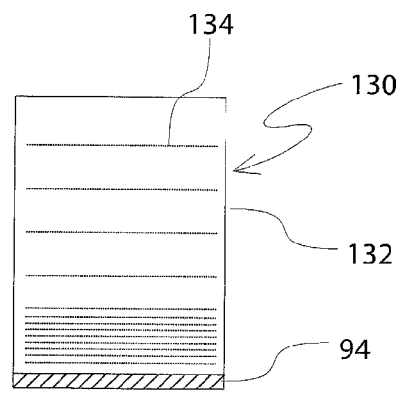
FIG. 6A
FIG. 6B
FIG. 6C
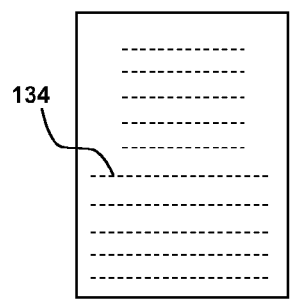
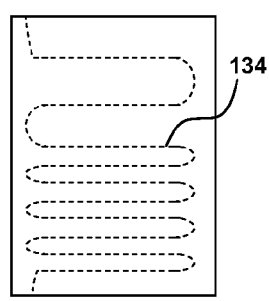
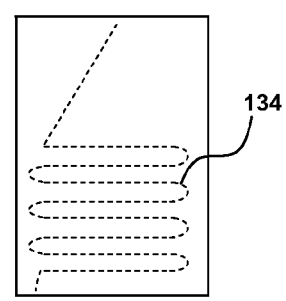

AIR BAG AND AIR BAG DEVICE

This application is the National Phase of PCT/JP2011/075291 filed Nov. 2, 2011, which claims priority to Japanese Application No. 2010-247253 filed Nov. 4, 2010, the disclosures of which are hereby incorporated by reference in their entirety.

BACKGROUND OF THE INVENTION

1. Field of the Invention

The present invention relates to an air bag for restraining an occupant at a time of collision of an automobile or the like, and to an air bag device utilizing the air bag.

2. Description of the Related Art

The air bag device restrains the occupant by inflating and expanding the air bag from a folded state by ejected gas from an inflator in case of emergency, such as collision and rolling of an automobile. When a vent hole is provided in the air bag, the above described occupant or the like can be softly received with the air bag by flowing out the gas from an internal portion of the air bag via the vent hole when the occupant or the like comes into contact with the inflated air bag.

As a driver seat air bag which is provided in a driver seat and restrains the occupant (driver), among the air bags provided with the vent hole as mentioned above, for example, a prior art described in JP, A, 2008-56175 has been known. The prior art is structured such that the vent hole is closed or is in a small opening degree state, until an internal pressure of the air bag becomes equal to or higher than a predetermined pressure, and the vent hole is opened or in a large opening degree state when the internal pressure of the air bag becomes equal to or higher than the predetermined pressure and the occupant comes into contact with the air bag.

In the air bag, the vent hole is provided at a position closer to an outer peripheral side of the air bag than a steering wheel in an arrangement when the air bag inflates and expanded in a rear panel, and the vent hole is covered with a lid member from an inner side of the air bag. Further, a strap coupling a front panel and the rear panel in an inner portion of the air bag is coupled to the lid member by a tether. Further, on a side closer to the center of the air bag than the vent hole, the tether is pinched between the front panel and the rear panel, and they are connected releasably by a linear sewing part formed by sewing or the like. As a result, when the internal pressure of the air bag becomes equal to or higher than the predetermined pressure, the connection among the front panel, the rear panel and the tether by the linear sewing part is released. Subsequently, the lid member is inhibited from moving to an external portion side of the air bag by the tether so as to overlap the vent hole until the occupant comes into contact with the air bag. As a result, the vent hole is closed or is in the small opening degree. Further, when the occupant comes into contact with the air bag and the front panel moves backward, the lid member gets away from the vent hole due to gas pressure in the internal portion of the air bag. As a result, the vent hole is opened or is in the large opening degree.

SUMMARY OF THE INVENTION

Problem to be Solved by the Invention

However, in the above described prior art, when the air bag is manufactured, end portions of the lid member for closing the vent hole are connected by the linear sewing part formed by sewing and the like, in a state in which the end portions are pinched between the front panel and the rear panel. The sewing work of the linear sewing part requires a positioning work for aligning relative positions of the lid member and the vent hole, and a displacement preventing work, and a working process has been complicated.

An object of the present invention is to provide an air bag which can desirably control an opening degree of a vent hole while simplifying a working process, and an air bag device using the air bag.

Means for Solving the Problem

In order to achieve the above-described object, according to the first invention, there is provided an air bag comprising an air bag main body formed as a bag body so as to have a surface facing to the occupant and a surface opposite to the occupant in an inflated state, a coupling member configured to couple the surface facing to the occupant and the surface opposite to the occupant inside the air bag main body, a vent hole formed in the surface opposite to the occupant, a lid member with its one end fixed to the surface opposite to the occupant and the other end side supported by the surface opposite to the occupant so as to normally close the vent hole, and a connecting member with its both ends fixed to the coupling member and the other end of the lid member, wherein the coupling member includes a bent part bent at least one position of a middle portion of the coupling member, and a connecting portion configured to maintain a bent state of the bent part, the connecting portion is provided at a plurality of positions of the bent part for expanding the coupling member step by step, and a density of arrangement of the connecting portions at the plurality of positions is sparser toward a rear stage side so that a connection releasing time from a front stage to the rear stage becomes quickened gradually.

In the first invention of the present application, the air bag main body is formed as the bag body which has the surface facing to the occupant and the surface opposite to the occupant in the inflated state. The coupling member is provided in the inner portion of the air bag main body, and the surface facing to the occupant and the surface opposite to the occupant are coupled by the coupling member. Further, in the air bag main body, the vent hole is formed in the surface opposite to the occupant. The vent hole is normally closed by the lid member with its one end fixed to the surface opposite to the occupant. The other end side of the lid member is fixed to the above described coupling member by the connecting member.

At this time, the bent part is provided in the coupling member, and the bent state of the bent part is maintained by the connecting portion. As a result, it is possible to set so that the bent state of the bent part is maintained until an early stage (first stage) in an initial stage of inflation. In this case, since the coupling member is not elongated in the first stage in which the bent state is maintained, the air bag main body inflates while keeping a state in which a distance between the surface facing to the occupant and the surface opposite to the occupant is comparatively short. At this time, since the bent state of the above described bent part is maintained and the length of the coupling member is comparatively short, the coupling member is in a state of tension and the connecting member is further in a state of tension even in the state in which the distance between the surface facing to the occupant and the surface opposite to the occupant is comparatively short as mentioned above, and the vent hole maintains the state in which the vent hole is closed by the lid member. As a result, the gas does not leak out of the vent hole, and the inflated state of the air bag main body is maintained. Further, since the maximum facing distance between the surface facing to the occupant and the surface opposite to the occupant is controlled by the tensed coupling member, it is possible to achieve an inflated state in which expansion can be sufficiently secured up and down and right and left.

Subsequently, when the expansion of the air bag main body makes progress, a plurality of coupling portions is all released at a predetermined timing, and the bent state of the bent part is released. In a second stage in which the bent state is released, the coupling member is elongated, the distance between the surface facing to the occupant and the surface opposite to the occupant becomes comparatively long, and the air bag main body is largely inflated. In this case, since the above described bent state is released and the length of the coupling member becomes long, the coupling member and the connecting member become in an appropriate tension state in the same manner as mentioned above, in correspondence to the large inflation of the above described air bag main body. As a result, the vent hole continuously maintains the state in which the vent hole is continuously closed by the lid member even in the second stage. Accordingly, in the same manner as mentioned above, the air bag main body becomes in the inflated state in which the gas is not leaked out of the vent hole and the expansion in up and down and right and left is sufficiently secured by the tensed coupling member.

As mentioned above, in the first invention of the present application, the closure of the vent hole is maintained by the appropriate tension of the coupling member in both the first stage and the second stage. In the first stage or the second stage in the state mentioned above, when a body of the occupant plunges into the surface facing to the occupant of the air bag main body by an inertia force due to the collision or the like of the vehicle, the surface facing to the occupant and the surface opposite to the occupant forcibly come close to each other against the internal pressure of the air bag main body. As a result, the coupling member and the connecting member under the tension state are slacked, and a part of the lid member gets away from the vent hole by the internal pressure of the air bag main body and becomes in an open state. Accordingly, in the first invention of the present application, it is possible to efficiently control the opening degree of the vent hole when the air bag main body inflates and expanded. At this time, the other end of the lid member is not necessarily coupled by the linear sewing part as with the structure of the prior arts, by making use of the switching between the maintenance and the release of the bent state of the coupling member, and a difference in length between the non-elongated state and the elongated state of the coupling member itself at that time. Accordingly, it is possible to simplify the working process when the air bag is manufactured.

Further, in the air bag on the driver seat side, the steering wheel housing the air bag is positioned in a front surface of a driver as the occupant. When the occupant seats in a normal state (hereinafter, refer to as "occupant in normal seating), a certain degree of distance exists between the occupant and the air bag. Therefore, when the collision or the like of the vehicle occurs, for example, the body of the occupant in normal seating does not reach the surface facing to the occupant of the air bag yet in the above described first stage, and the body plunges into the surface facing to the occupant in the second stage. On the contrary, due to circumstances of a seating position, a seating posture of the occupant and the like, the occupant may seat in a state in which the occupant is close to the steering wheel (hereinafter, appropriately referred to as "occupant in proximity"). In this case, when the collision or the like of the vehicle occurs, the body of the occupant in proximity immediately plunges into the surface facing to the occupant of the air bag main body, for example, in the above described first stage. In the first invention of the present application, as mentioned above, whenever the body of the occupant plunges into the air bag main body in the first stage or the body of the occupant plunges into the air bag main body in the second stage, the coupling member and the connecting member in the tension state are slacked, the gas flows out of the vent hole to the external portion, and the occupant can be softly received. In other words, it is possible to obtain an effect that the body can be softly received in both the occupant in normal seating and the occupant in proximity.

In the meantime, as mentioned above, the air bag according to the first invention of the present application has a characteristic which can execute both the inflating behaviors of the first stage in the inflation early stage capable of preferably restraining the occupant in proximity on the basis of the maintenance of the bent state of the bent part by the connecting portion, and the second stage capable of preferably restraining the occupant in normal seating on the basis of the release of the bent state of the bent part. At this time, when the first stage is finished and is changed to the second stage, the bent state of the bent part is released as mentioned above and the coupling member is switched to the elongated state from the non-elongated state. Accordingly, the distance between the surface facing to the occupant and the surface opposite to the occupant is switched from a comparatively near state to a far state. Here, for example, the occupant seating in an intermediate state between the above described occupant in proximity and the occupant in normal seating may plunge into the surface facing to the occupant of the air bag main body in the above described switching state. Accordingly, in the above described switching state, the inflated state of the air bag main body desirably behaves so as to smoothly change.

Accordingly, in the first invention of the present application, the connecting portions are provided at a plurality of positions in the bent part so that the expansion of the coupling member can be carried out in stages. Further, in the connecting portions provided at the plurality of positions in the bent part, a density of arrangement is sparser toward a rear stage side, and whereby a connection releasing time from a front stage to the rear stage is quickened gradually. As a result, when the connecting portions are released, the connecting portions are not released at a stroke from the front stage to the rear stage, but are slowly released in the first front stage. Therefore, the switching from the first stage makes progress slowly, and the switching to the second stage can be carried out quickly by speeding up the releasing speed after the rear stage in which the releasing operation makes progress at a certain degree. As a result, the inflated state of the air bag main body can be smoothly switched from the first stage to the second stage via the vicinity of a boundary between the first and second stages.

According to the second invention, in the air bag according to the first invention, a plural of the coupling members are provided between the surface facing to the occupant and the surface opposite to the occupant, and each of the coupling members includes the bent part and the connecting portion.

As a result, even in the case that a plurality of coupling members is provided, it is possible to keep a balance in the inflating time of the air bag main body.

According to the third invention, there is provided an air bag device comprising the air bag in the first invention, and an inflator configured to supply pressure gas inside the air bag main body.

As a result, it is possible to achieve the air bag device having the effect of the air bag according to the above described first invention.

Advantages of the Invention

According to the present invention, it is possible to desirably control the opening degree of the vent hole while simplifying the working process.

BRIEF DESCRIPTION OF THE DRAWING

FIG. 5A is a perspective view of an essential part in an example of a bent part and a connecting portion of a coupling member.

FIG. 5B is a perspective view of the essential part in the example of the bent part and the connecting portion of the coupling member.

FIG. 6A is a perspective view of an essential part in the other example of the bent part and the connecting portion of the coupling member.

FIG. 6B is a perspective view of the essential part in the other example of the bent part and the connecting portion of the coupling member.

FIG. 6C is a perspective view of the essential part in the other example of the bent part and the connecting portion of the coupling member.

DETAILED DESCRIPTION OF THE PREFERRED EMBODIMENTS

Hereinafter, embodiments according to the present invention will be described with reference to the accompanying drawings.

Figure 1:
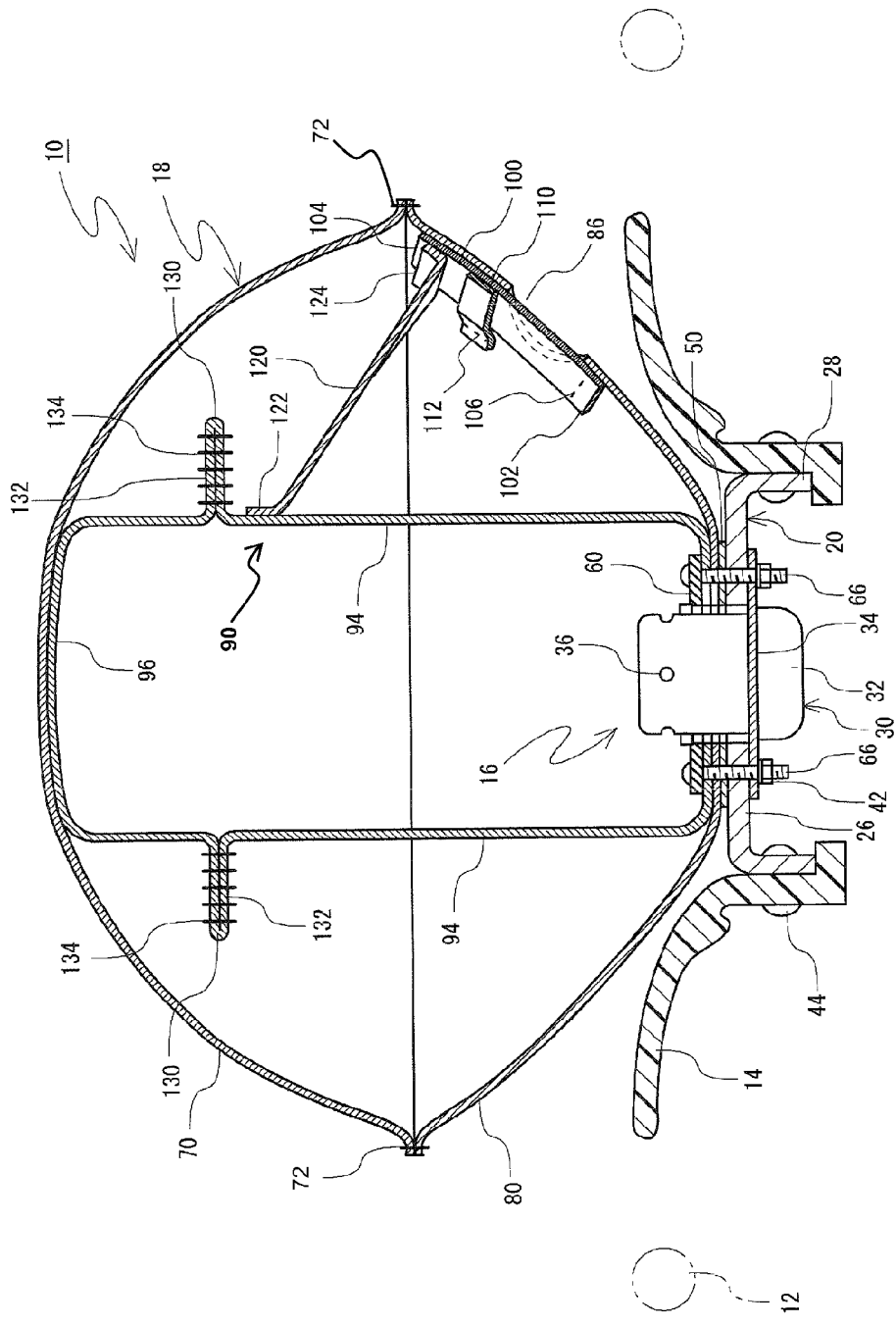
FIG. 1 is a cross sectional view of an essential part of an air bag device according to an embodiment of the present invention.
Figure 2:
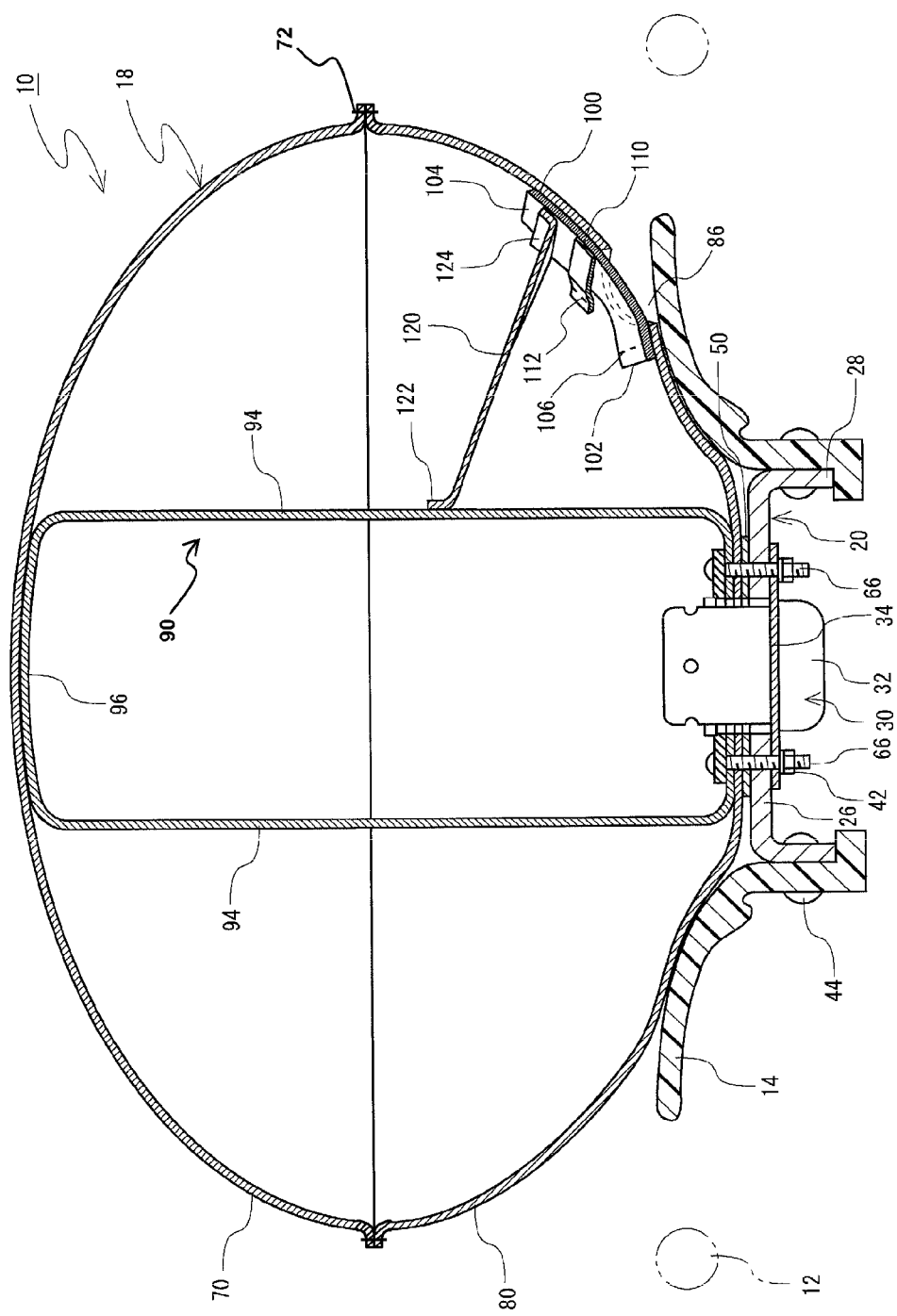
FIG. 2 is a cross sectional view of an essential part in the case that an inflation of an air bag becomes an inflated state in a second stage, in the air bag device shown in FIG. 1.
Figure 3:
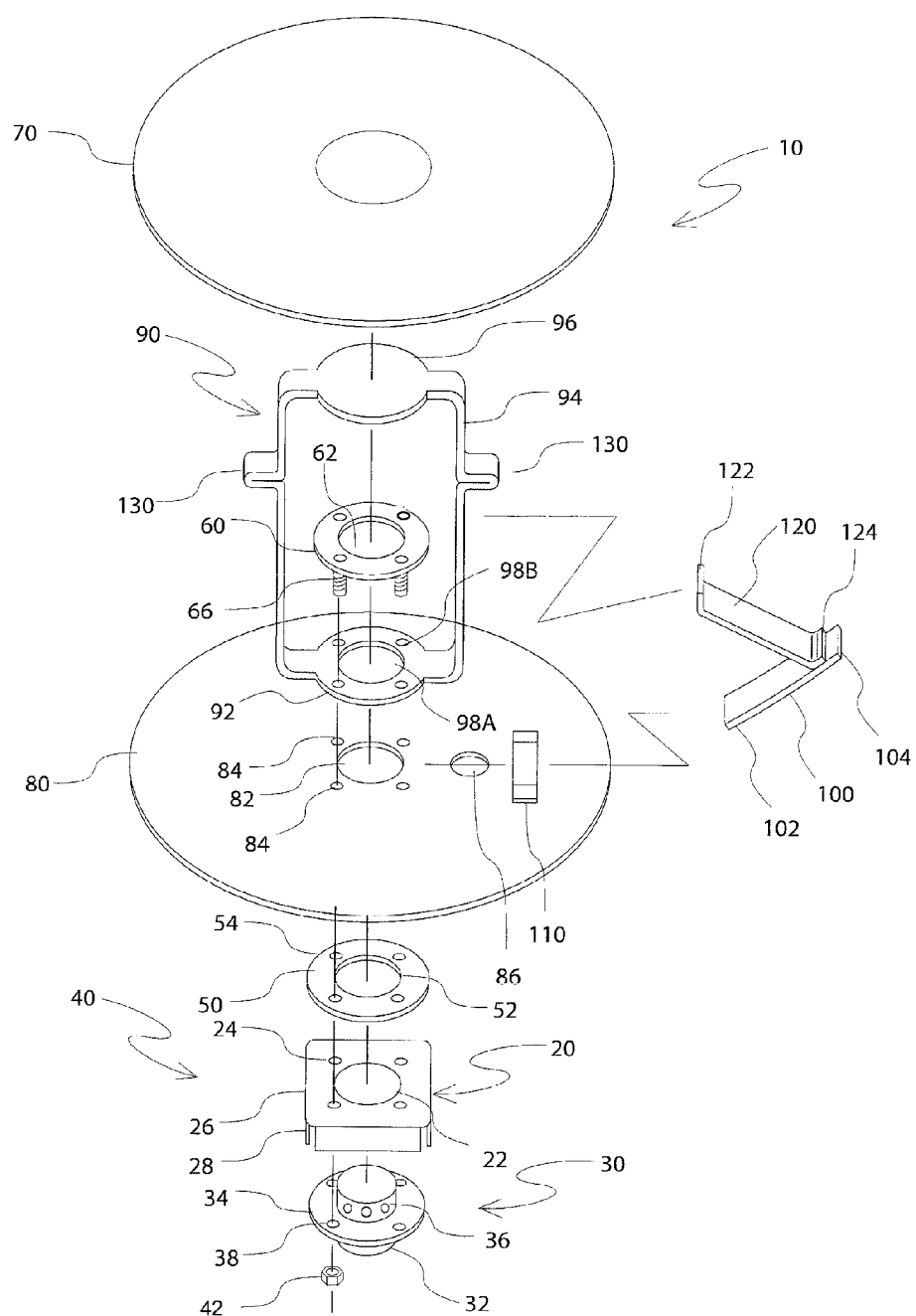
FIG. 3 is an exploded perspective view of the air bag device shown in FIG. 1.
Figure 4:
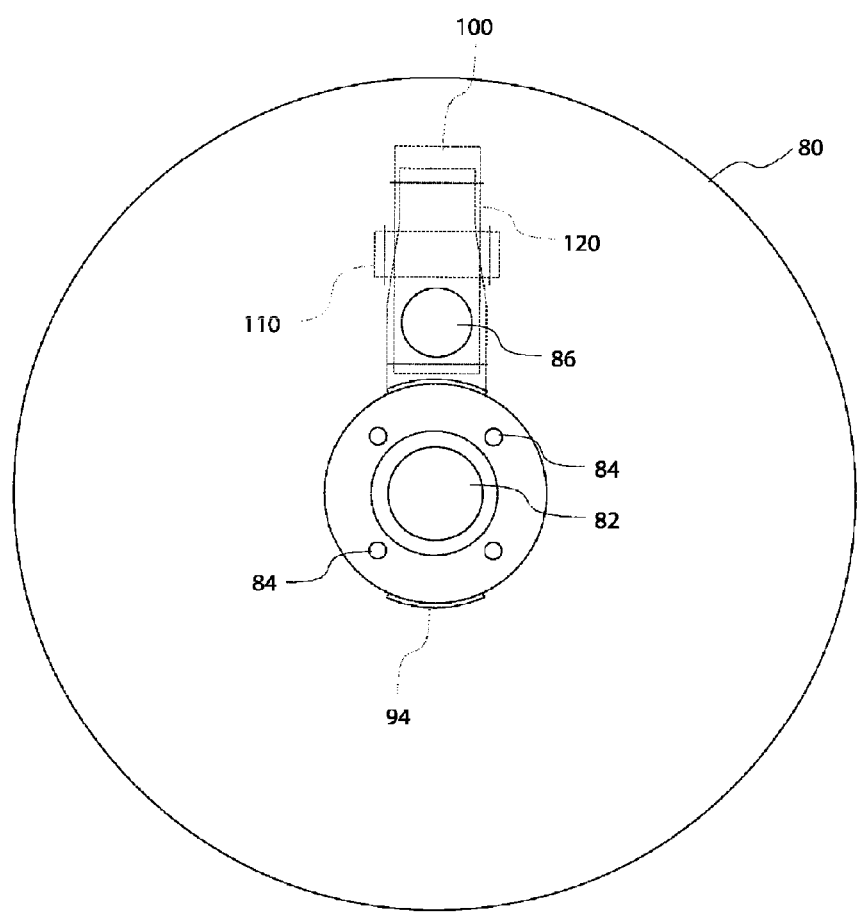
FIG. 4 is a bottom elevational view of an air bag main body of the air bag device shown in FIG. 1.

FIG. 1 is a cross sectional view of an essential part and shows a state in which an air bag inflates in a first stage by connecting a linear sewing part in an air bag device according to an embodiment of the present invention, FIG. 2 is a cross sectional view of an essential part and shows a state in which the air bag inflates in a second stage by releasing the connection of the linear sewing part in the air bag device shown in FIG. 1, FIG. 3 is an exploded perspective view of the air bag device shown in FIG. 1, and FIG. 4 is a bottom elevational view of an air bag main body of the air bag device shown in FIG. 1. Note that, the present embodiment will be described by exemplifying the case that the present invention is applied to a driver seat side air bag which is provided in a driver seat of a vehicle.

In FIGS. 1 to 4, an air bag device 10 includes a resin module cover 14 which is fixed to the vicinity of the center inside a steering wheel 12, an actuation unit 16 which is fixed to the module cover 14, and an air bag main body 18 which is fixed to the actuation unit 16.

The module cover 14 is arranged in the center of the steering wheel 12, and normally covers the air bag main body 18 so as to serve as a housing container of the air bag main body 18. Further, when the air bag main body 18 inflates, the module cover 14 breaks and opens along a breaking groove (not shown) which is formed on a front surface or a rear surface of the module cover 14, and whereby the air bag main body 18 inflates to an occupant side in a protruding state.

The actuation unit 16 includes a metal retainer 20 which is fixed to the module cover 14, an inflator 30 which ejects pressure gas, and a fixing unit 40 for fixing the inflator 30 and the air bag main body 18 to the retainer 20.

The retainer 20 is formed by a pressing work, a punching work of the metal or the like, and forms an approximately square base portion 26 which forms an inflator (gas introduction) opening 22 and bolt insertion holes 24, and flange portions 28 which are folded downward from four sides of the base portion 26, as shown in FIG. 3. Further, the bolt insertion holes 24 are formed at four positions around the inflator opening 22.

The inflator 30 includes an approximately circular columnar inflator main body 32, and an attaching flange portion 34 which is formed in a middle portion of the inflator main body 32 and is positioned on a bottom surface side of the base portion 26. Note that, a known gas injecting mechanism (not shown) is provided in an inner portion of the inflator main body 32. Further, the inflator main body 32 is provided with a plurality of gas ejecting ports 36 in a side peripheral surface closer to a leading end side in an axial direction than the attaching flange portion 34. Further, bolt insertion holes 38 are formed in the attaching flange portion 34.

The fixing unit 40 includes a metal fixing ring 50 which is positioned on an upper surface side of the base portion 26, a metal fixing ring 60 which pinches the air bag main body 18 together with the fixing ring 50, a nut 42, and a screw 44 (refer to FIGS. 1 and 2) for fixing the retainer 20 to the module cover 14.

The fixing ring 50 and the fixing ring 60 are formed as an annular shape, and include inflator openings 52 and 62 which are formed approximately in the center thereof, and bolt insertion holes 54 are formed around the inflator opening 52. Note that, in the present embodiment, a diameter of the fixing ring 50 is made slightly larger than a diameter of the fixing ring 60. Further, stud bolts 66 are provided on a bottom surface side of the fixing ring 60.

The air bag main body 18 includes a front panel 70 which constructs a surface facing to the occupant, and a rear panel 80 which constructs a surface opposite to the occupant on the opposite side of the surface facing to the occupant.

Each of the front panel 70 and the rear panel 80 is constructed by a woven cloth made of the same circular raw material. The front panel 70 and the rear panel 80 have approximately the same diameter, and are formed as a bag body shaped air bag main body 18 with their outer peripheral edge portions being seamed by a peripheral edge seam 72. Note that, the peripheral edge seam 72 is peripherally provided annularly (circumferentially) along the outer peripheries of the front panel 70 and the rear panel 80. Further, the peripheral edge seam 72 is a high strength seam which does not break even if an internal pressure of the air bag main body 18 becomes equal to or higher than a predetermined pressure. Note that, the peripheral edge seam 72 is constructed by a sewing thread or the like, but is not limited to this.

The rear panel 80 includes an inflator opening 82 which is formed in the center (centrally), bolt insertion holes 84 which are formed around the inflator opening 82, and a vent hole 86.

The vent hole 86 is provided at a position which is a predetermined distance away from a peripheral edge portion of the rear panel 80 and closer to the center side of the rear panel 80 so as to couple inner and outer sides of the air bag main body 18. Further, the vent hole 86 is provided in a comparatively inner peripheral side in the rear panel 80. Accordingly, in the case that the air bag device 10 according to the present invention is installed as the air bag for the driver seat of the vehicle mentioned above, the vent hole 86 is positioned closer to an inner peripheral side of the air bag main body 18 than the steering wheel 12 in view of an arrangement at an inflating and expanding time in the rear panel 80.

On the other hand, an inner portion of the air bag main body 18 includes a coupling member 90 which bridges between the vicinity of the center of the front panel 70 and the vicinity of the center of the rear panel 80, a lid member 100 with its one end 102 fixed to the rear panel 80 by seaming and the like, so as to cover the vent hole 86 from an inner side, a band-like support member 110 which slidably supports the vicinity of the other end 104 of the lid member 100 in cooperation with the rear panel 80, and a connecting member 120 with its both ends fixed to the coupling member 90 and the other end 104 of the lid member 100.

The coupling member 90 includes an annular ring base cloth 92 which is positioned around the inflator opening 82 in the rear panel 80, band-like straps 94 which are integrally arranged their one end sides at two opposed outer peripheral positions of the ring base cloth 92, a circular strap connecting portion 96 which is integrally arranged in the other end sides of a pair of the straps 94, and adjusting portions 130 which are formed in middle portions of a pair of the straps 94.

The annular ring base cloth 92 includes an inflator opening 98A which is formed in the center (centrally), and bolt insertion holes 98B which are formed around the inflator opening 98A. Further, the ring base cloth 92 has its front and rear sides pinched together with the rear panel 80 between the fixing rings 50 and 60 so as to be fixed to the retainer 20.

The strap connecting portion 96 is formed approximately as a complete round shape in the present embodiment, and is seamed by seaming to the vicinity of approximately the center of an inner wall surface of the front panel 70.

The adjusting portion 130 includes a bent part 132 which is bent so as to fold back at least one position of the middle portion of the coupling member 90, and a connecting portion 134 which maintains a bent state of the bent part 132.

The bent part 132 is double folded in the present embodiment, and is folded back at a length which defines a maximum facing distance between the front panel 70 and the rear panel 80 by forming a tension state when the air bag main body 18 inflates while keeping the connection of the connecting portion 134 (hereinafter, appropriately referred to as "first stage"), as shown in FIG. 1, and defines a maximum facing distance between the front panel 70 and the rear panel 80 by forming a tension state when the air bag main body 18 inflates while releasing the connection of the connecting portion 134 (hereinafter, appropriately referred to as "second stage"), as shown in FIG. 2. Note that, the maximum facing distance is set to a dimension by which the air bag main body 18 can be expanded and formed at an appropriate thickness as a whole on the basis of past experiential values when the air bag main body 18 inflates in each stage, in relation to the occupant in proximity in the first stage and in relation to the occupant in normal seating in the second stage.

The connecting portion 134 is constructed by a sewing thread (tear seam) or the like in this example, and is set previously so as to achieve a desired connecting strength. At this time, the connecting portion 134 is formed as a plurality of independent linear shapes which are provided at a plurality of positions, and a density (a distance in this example) of arrangement of the respective linear connecting portions 134 is sparser toward a rear stage so that a connection releasing time is quickened gradually from a front stage positioned on a main body side (a lower side in the drawing) of the strap 94 to the rear stage on an opposite side (an upper side in the drawing), as shown in FIGS. 5A and 5B, for example. As a result, it is possible to release the connection by a plurality of connecting portions 134 step by step, and it is possible to set so that the inflation in the thickness direction does not rapidly occur. Note that, without being limited to the structure in FIGS. 5A and 5B, the density of arrangement may be made sparser by making lengths of the linear connecting portions shorter on the rear stage side than on the front stage side while keeping the distance of arrangement of the respective linear connecting portions uniform, for example, as shown in FIG. 6A. Further, as shown in FIGS. 6B and 6C, the connecting portions 134 may be formed as one continuous spiral shape by connecting end portions of a plurality of lines. In the example in FIG. 6B, a distance of arrangement between the respective linear portions (in which the end portions are coupled to each other) is wider on the rear stage side than on the front stage side, in the same manner as FIGS. 5A and 5B. In the example in FIG. 6C, the above described plurality of linear portions is arranged approximately at even intervals on the front stage side, and a linear connecting portion is arranged approximately straightly in a diagonal direction on the rear stage side, and whereby the connection release of the rear stage portion can be more rapidly carried out.

Returning to FIGS. 1 to 4, the lid member 100 is extended along a radial direction of the rear panel 80, and is arranged so as to transverse (cover) the vent hole 86, and an end portion in the center side of the rear panel 80 is sewn to the rear panel 80 by a seam 106, in a position closer to the center side of the rear panel 80 than the vent hole 86. The lid member 100 is overlapped with the vent hole 86 from the inner portion side of the air bag main body 18 in the present embodiment. Further, the lid member 100 can employ the same material and the same thickness as those of the rear panel 80, but the material and the thickness are not limited so that the lid member 100 can be more easily deformed than the rear panel 80. Further, a width of the lid member 100 is preferably made slightly larger than a diameter of the vent hole 86, but on the basis of a relation between the deformation easiness mentioned above and the internal pressure of the air bag main body 18, it is necessary to prevent a part of the lid member 100 from unexpectedly protrude out of the vent hole 86 to an external portion when the air bag main body 18 inflates.

The support member 110 is arranged closer to the center of the rear panel 80 in an outer peripheral side of the rear panel 80 than the vent hole 86. The support member 110 is constructed by an approximately rectangular small cloth in the present embodiment. The support member 110 is arranged by setting a longitudinal direction to a peripheral direction of the rear panel 80 (an intersecting direction to an extending direction of the lid member 100), and a pair of side portions which are faced to each other in the longitudinal direction are sewn to the rear panel 80 by a seam 112, respectively. The lid member 100 is drawn through a portion between the remaining pair of sides which are faced to each other in a width direction of the support member 110 and the rear panel 80.

The connecting member 120 is drawn to the front panel 70 side from the rear panel 80 side in the inner portion of the air bag main body 18, one end 122 of the connecting member 120 is connected and fixed to the middle portion of the strap 94, and the other end 124 is connected and fixed to the vicinity of the other end 104 of the lid member 100. A length of the connecting member 120 is tensed between the midstream connecting portion to the strap 94 and the support member 110 in both the first stage state and the second stage state, when the air bag inflates in a state in which any external pressure is not applied from the front panel 70, thereby preventing a part of the lid member 100 from being pushed out of the vent hole 86 to the outer side of the air bag main body 18 due to the gas pressure. Further, the length of the connecting member 120 is set to a dimension which can prevent the lid member 100 from being excessively pulled to the inner side of the air bag main body 18 by the connecting member 120 so as to float up from the inner surface of the air bag in the rear panel 80.

Next, an attachment of the air bag main body 18 will be described. When the air bag main body 18 structured as mentioned above is attached to the retainer 20, a peripheral edge portion of the inflator opening 82 of the rear panel 80 is overlapped with a peripheral edge portion of the inflator opening 22 of the retainer 20. Further, the stud bolts 66 of the fixing ring 60 are passed through the respective bolt insertion holes 98B, 84, 54, 24 and 38 of the ring base cloth 92, the rear panel 80, the fixing ring 50, the retainer 20 and the attaching flange portion 34, and the nuts 42 are fastened into the leading ends of the studs bolts, so that the inflator 30 and the air bag main body 18 are fixed to the retainer 20. As a result, the rear panel 80 and the ring base cloth 92 are pinched between the fixing rings 50 and 60 so as to be fixed.

Subsequently, the air bag device 10 is constructed by folding the air bag main body 18 and attaching the retainer 20 to the module cover 14 so as to cover the folded body of the air bag main body 18. However, the air bag main body 18 may be previously folded before the air bag main body 18 is attached to the retainer 20. The air bag device 10 is installed to the steering wheel 12 of the automobile.

Next, an actuation of the air bag device 10 will be described. The actuation of the air bag device 10 is as follows. When an actuation signal is input to the inflator 30 from a control device (not particularly shown) of the occupant restraining device, the inflator 30 is actuated and the gas is ejected into the air bag main body 18. The air bag main body 18 inflates by the gas and the module cover 14 is broken and opened so as to be expanded into the vehicle chamber.

In this case, since the connection of the connecting portion 134 is not released and the coupling member 90 is in the non-elongated state as shown in FIG. 1 until the internal pressure of the air bag main body 18 becomes equal to or higher than the predetermined pressure, the air bag main body 18 inflates while keeping a state in which the distance between the front panel 70 and the rear panel 80 is comparatively short. In other words, the air bag main body 18 is controlled its inflation by the coupling member 90. Further, the lid member 100 is inhibited from moving to the external portion side of the air bag main body 18 by the tension state of the strap 94 and the connecting member 120 and the support member 110 so as to be in a state in which the lid member 100 overlaps (covers) the vent hole 86. As a result, the vent hole 86 is closed, and an outflow of the gas from the vent hole 86 to the air bag main body 18 is controlled. Therefore, the internal pressure of the air bag main body 18 is quickly raised without using the inflator 30 having a high power.

Here, in the air bag in the driver seat side, the steering wheel 12 housing the air bag device 10 is generally positioned in a front surface of a driver as the occupant. When the occupant seats on a normal state (hereinafter, refer to as "occupant in normal seating), a certain degree of distance exists between the occupant and the air bag device 10. Therefore, when the collision or the like of the vehicle occurs, for example, a body M (refer to FIGS. 8A and 8B mentioned later) of the occupant in normal seating does not reach the surface facing to the occupant of the air bag yet in the above described first stage, and the body M plunges into the surface facing to the occupant in the second stage. On the contrary, due to circumstances of a seating position, a seating posture of the occupant and the like, the occupant may seat in a state in which the occupant is close to the steering wheel 12 (hereinafter, appropriately referred to as "occupant in proximity"). In this case, when the collision or the like of the vehicle occurs, the body M (refer to FIGS. 7A and 7B mentioned later) of the occupant in proximity immediately plunges into the surface facing to the occupant of the air bag main body, for example, in the above described first stage.

Figure 7A:
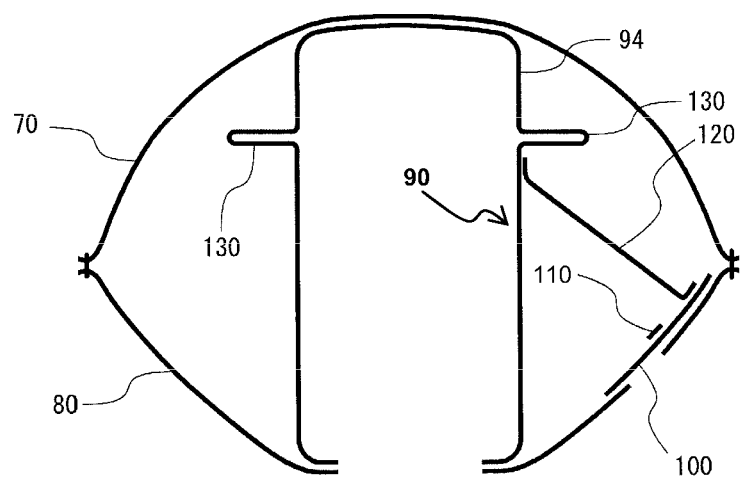
FIG. 7A is an explanatory view schematically showing an inflated state in a first stage in the air bag device shown in FIG. 1.
Figure 7B:
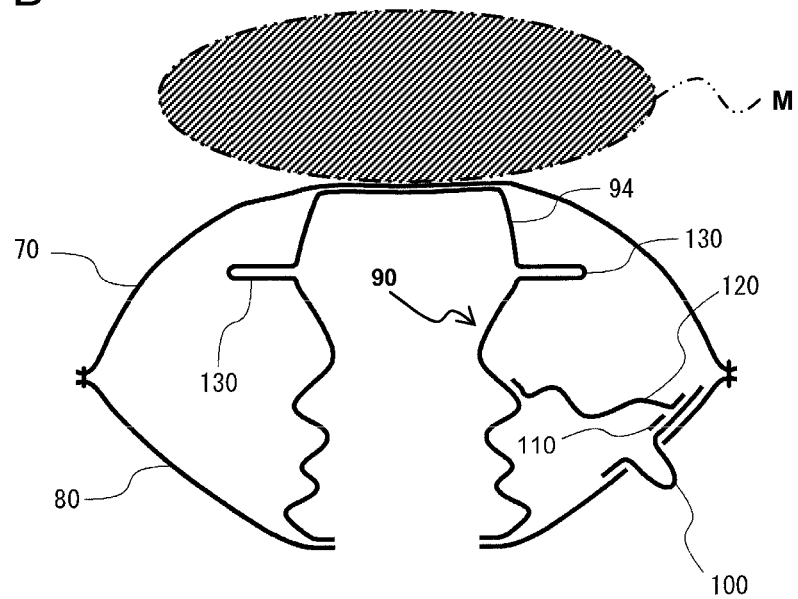
FIG. 7B is an explanatory view schematically showing a restraining state in a first stage to an occupant in proximity, in the air bag device shown in FIG. 1.
Figure 8A:
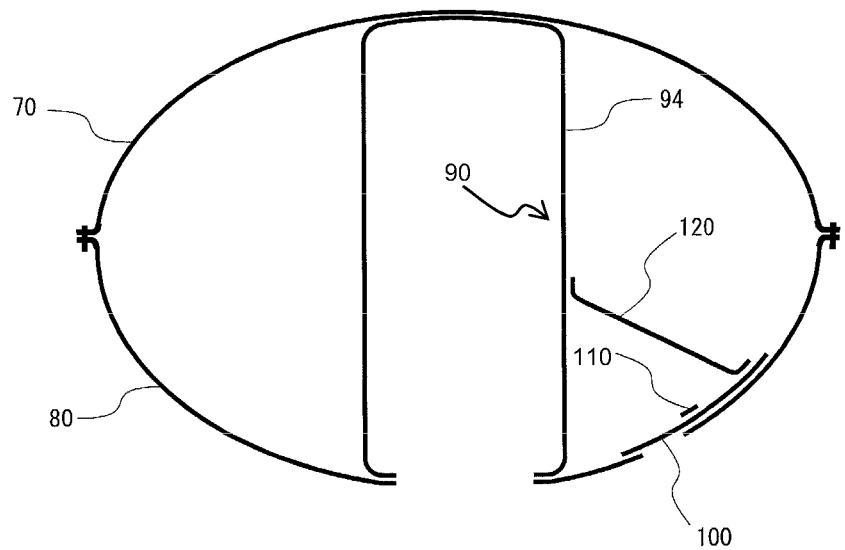
FIG. 8A is an explanatory view schematically showing an inflated state in a second stage in the air bag device shown in FIG. 1.

As mentioned above, when the body M of the occupant in proximity comes into contact with the air bag main body 18 in the first stage shown in FIG. 7A, the front panel 70 is pushed by the body M so as to be moved backward to the rear panel 80 side and the strap 94 and the connecting member 120 are slacked as shown in FIG. 7B, whereby the lid member 100 can move to the external portion side of the air bag main body 18 only at that degree. As a result, the lid member 100 is pushed out to the external portion of the air bag main body 18 from the vent hole 86 due to the gas pressure within the air bag main body 18, and the vent hole 86 is opened. As a result, the gas flows out of the vent hole 86 to the external portion of the air bag main body 18, and the body M of the occupant in proximity can be received softly by the air bag main body 18.

In the meantime, a stress caused by the internal pressure of the air bag main body 18 acts in a direction of elongating the coupling member 90 which couples the front panel 70 and the rear panel 80. As a result, when the internal pressure of the air bag main body 18 becomes equal to or higher than a predetermined value (a previously set desired value), the release of the bending of the bent part 132 is started by breaking the connecting portion 134. When all the connecting portion 134 is broken and the bending of the bent part 132 is released, the coupling member 90 becomes in an elongated state as shown in FIG. 2, the distance between the front panel 70 and the rear panel 80 becomes comparatively far, and the air bag main body 18 inflates largely.

Subsequently, the lid member 100 is inhibited from moving to the external portion side of the air bag main body 18 by the strap 94 and the connecting member 120 so as to overlap the vent hole 86 until the body M of the occupant comes into contact with the air bag main body 18. As a result, the vent hole 86 is in a closed state. Therefore, the outflow of the gas from the vent hole 86 is controlled also in this state, and the internal pressure of the air bag main body 18 is maintained equal to or higher than the predetermined pressure.

Figure 8B:
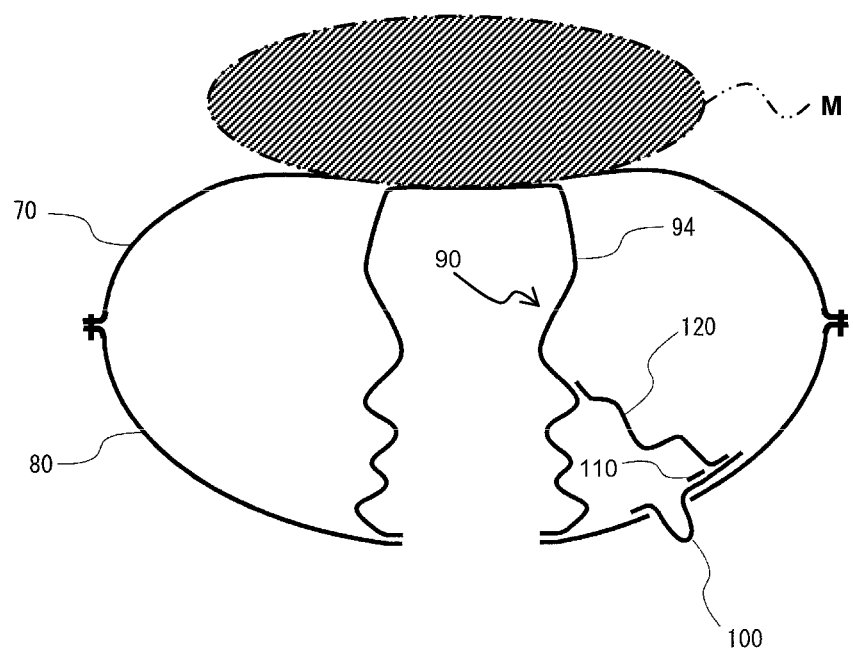
FIG. 8B is an explanatory view schematically showing a restraining state in a second stage to the occupant in normal seating, in the air bag device shown in FIG. 1.

As mentioned above, the body M of the occupant in normal seating plunges into the air bag main body 18 after the second stage. When the body M of the occupant in normal seating comes into contact with the air bag main body 18 in the second stage shown in FIG. 8A, the front panel 70 is pushed by the body M so as to move backward to the rear panel 80 side and the strap 94 and the connecting member 120 are slacked as shown in FIG. 8B, whereby the lid member 100 can move to the external portion side of the air bag main body 18 at that degree. As a result, the lid member 100 is pushed out of the vent hole 86 to the external portion of the air bag main body 18 due to the gas pressure within the air bag main body 18, and the vent hole 86 is opened. As a result, the gas flows out of the vent hole 86 to the external portion of the air bag main body 18, and the body M of the occupant in normal seating can be softly received by the air bag main body 18.

As a result, when the air bag main body 18 holds the predetermined internal pressure for a longer time, the vent hole 86 is closed, the internal pressure of the air bag main body 18 becomes equal to or higher than the predetermined pressure, and the occupant comes into contact with the air bag main body 18, the vent hole 86 is opened.

Further, when the air bag main body 18 receives the occupant and the front panel 70 moves backward after the connecting portion 134 is broken, the strap 94 is slacked, the tension of the connecting member 120 is released, and the lid member 100 gets away from the vent hole 86.

Further, in the present embodiment, the lid member 100 covers the vent hole 86 from the inner side of the air bag main body 18, the support member 110 is provided in a side closer to the outer periphery of the air bag main body 18 than the vent hole 86 in the inner surface of the air bag main body 18, and the one end 102 of the lid member 100 is connected to the rear panel 80 in a side closer to the center of the air bag main body 18 than the vent hole 86. As a result, when the air bag main body 18 inflates, the lid member 100 covering the vent hole 86 from the inner side of the air bag main body 18, and the portion connected to the lid member 100 in the connecting member 120 (the portion from the support member 110 to the lid member 100) are continuously extended along the inner surface of the air bag main body 18. Accordingly, an adhesion of the lid member 100 to the inner surface of the rear panel 80, that is, a close nature of the vent hole 86 becomes good.

As described above, in the air bag device 10 according to the present embodiment, the bent part 132 is provided in the coupling member 90 which is arranged in the air bag main body 18, and in the bent state of the bent part 132, the bent part 132 is maintained in the bent state by the connecting portion 134 up to the first stage in the initial stage of inflation. In the first stage in which the bent state is maintained, the coupling member 90 is in the non-elongated state. Accordingly, the air bag main body 18 inflates while keeping the state in which the distance between the front panel 70 and the rear panel 80 is comparatively short. At this time, since the above described bent state of the bent part 132 is maintained and the length of the coupling member 90 is comparatively short, the coupling member 90 becomes in the tension state and the connecting member 120 further becomes in the tension state even in the state in which the distance between the front panel 70 and the rear panel 80 is comparatively short as mentioned above, and the vent hole 86 maintains the state of being closed by the lid member 100 (refer to FIG. 1). As a result, the gas does not leak from the vent hole 86, and the inflated state of the air bag main body 18 is maintained. Further, since the maximum facing distance between the front panel 70 and the rear panel 80 is controlled by the tensed coupling member 90, it is possible to achieve an inflated state in which an expansion up and down and right and left can be sufficiently secured.

Subsequently, when the expansion of the air bag main body 18 makes progress, all of a plurality of connecting portions 134 are released at a predetermined timing, and the bent state of the bent part 132 is released. In the second stage in which the bent state is released, the coupling member 90 becomes the elongated state, and the distance between the front panel 70 and the rear panel 80 becomes comparatively far, whereby the air bag main body 18 inflates largely. In this case, since the above described bent state is released, the length of the coupling member 90 becomes longer. As a result, the coupling member 90 and the connecting member 120 become an appropriate tension state in the same manner as mentioned above in conformity to the large inflation of the above described air bag main body 18 (refer to FIG. 2). As a result, in the second stage, the vent hole 86 continuously maintains the state in which the vent hole 86 is closed by the lid member 100. Therefore, in the same manner as mentioned above, the air bag main body 18 becomes the inflated state in which the gas is not leaked from the vent hole 86 and the expansion up and down and right and left can be sufficiently secured by the tensed coupling member 90.

As mentioned above, in the present embodiment, in both the first stage and the second stage, the closure of the vent hole 86 is maintained by the appropriate tension of the coupling member 90. In the first stage or the second stage under the state mentioned above, when the body M of the occupant plunges into the front panel 70 of the air bag main body 18 due to the inertia force caused by the occurrence of collision of the vehicle or the like, the front panel 70 and the rear panel 80 forcibly come close to each other against the internal pressure of the air bag main body 18. As a result, the coupling member 90 and the connecting member 120 which were in the tension state up to then are slacked, and a part of the lid member 100 gets away from the vent hole 86 due to the internal pressure of the air bag main body 18 so as to form the open state. As mentioned above, in the present embodiment, the opening degree of the vent hole 86 can be efficiently controlled when the air bag main body 18 inflates and expanded. At this time, it is not necessary to connect the other end of the lid member 100 by the linear sewing part according to the structure of prior arts, by making use of the switching between the maintenance and the release of the bent state of the bent part 132 in the coupling member 90, and the difference in length between the non-elongated state and the elongated state of the coupling member 90 itself at that time. Therefore, it is possible to simplify the working process when the air bag is manufactured.

Further, the body M of the occupant in normal seating plunges into the front panel 70, for example, after the second stage. On the contrary, the body M of the occupant in proximity plunges into the front panel 70 of the air bag main body, for example, immediately in the above described first stage. In the present embodiment, in both the case that the body M of the occupant plunges into in the first stage (refer to FIGS. 7A and 7B), and the case that the body M of the occupant plunges into in the second stage (refer to FIGS. 8A and 8B), the coupling member 90 and the connecting member 120 which are in the tension state up to then are slacked as mentioned above, whereby the gas can be flowed out of the vent hole 86 to the external portion and the body M of the occupant can be softly received, In other words, it is possible to obtain an effect that the body M can be softly received in both the occupant in normal seating and the occupant in proximity.

In the meantime, as mentioned above, the air bag device 10 according to the present embodiment includes a characteristic which can execute both the inflating behaviors of the first stage in the initial stage of inflation in which the body M of the occupant in proximity can be preferably restrained on the basis of the maintenance of the bent state of the bent part 132 by the connecting portion 134, and the second stage in which the body M of the occupant in normal seating can be preferably restrained on the basis of the release of the bent state of the bent part 132. At this time, when the first stage is finished and is changed to the second stage, the bent state of the bent part 132 is released as mentioned above, whereby the coupling member 90 is switched to the elongated state from the non-elongated state, and the distance between the front panel 70 and the rear panel 80 is switched to the far state from the comparatively near state. Here, for example, in the case of the occupant seating in an intermediate state between the above described occupant in proximity and occupant in normal seating, the body M of the occupant may plunge into the front panel 70 of the air bag main body 18 when the body M is in the above described switched state. Therefore, it is desirable to behave so that the inflated state of the air bag main body 18 smoothly changes, in the switch mentioned above.

Figure 9:
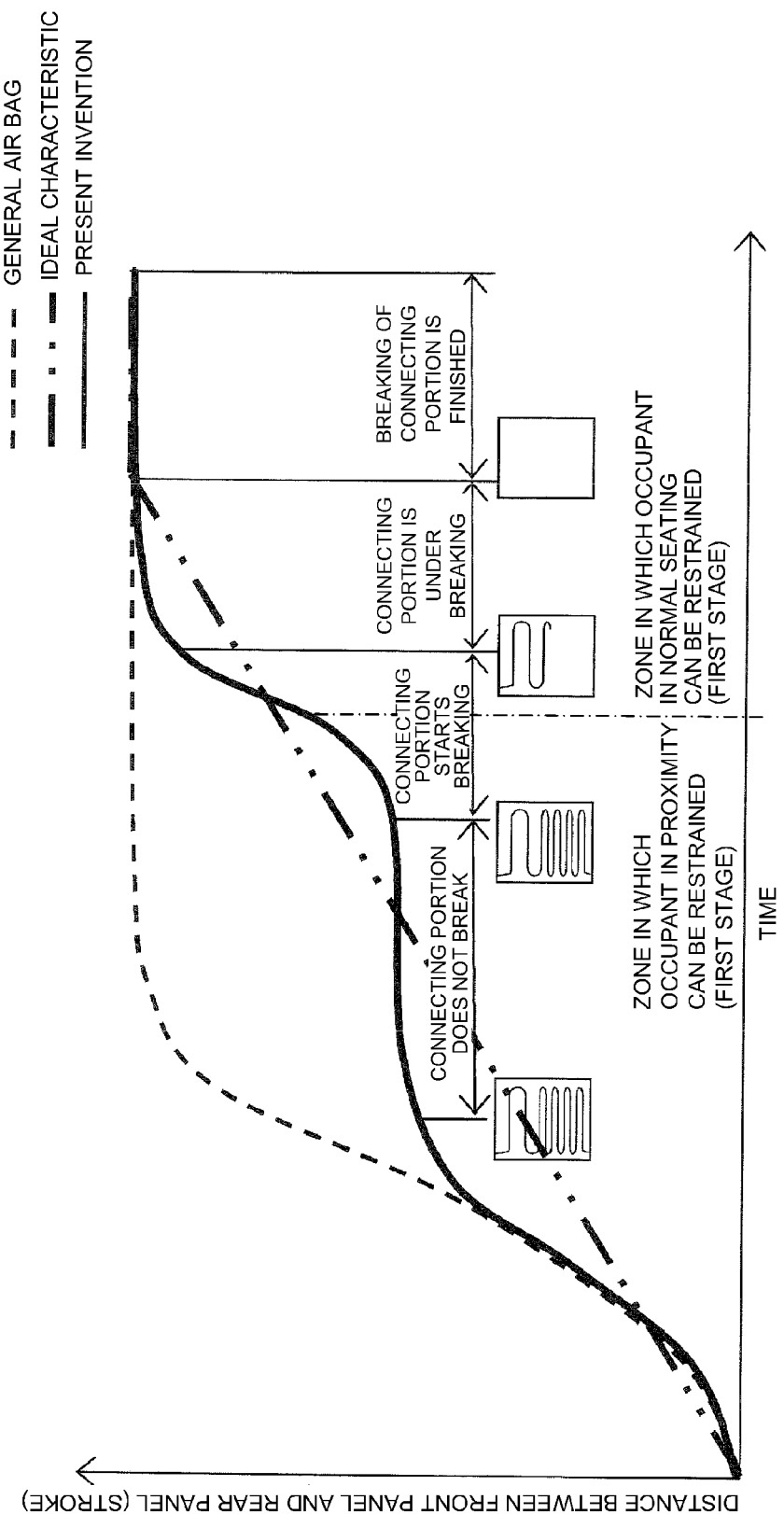
FIG. 9 is an explanatory view for explaining a temporal inflating characteristic of the air bag device shown in FIG. 1.

Accordingly, in the present embodiment, the connecting portions 134 are provided at a plurality of positions of the bent part 132 so that the expansion of the coupling member 90 can be carried out step by step (refer to FIGS. 5A and 5B). Further, the connecting portions 134 provided at a plurality of positions of the bent part 132 are structured such that a density of arrangement is sparser toward the rear stage side, whereby a connection releasing time from the front stage to the rear stage is quickened gradually. As a result, when the connecting portions 134 are released as shown in FIG. 9, the connecting portions 134 are not released at a stroke from the front stage to the rear stage, but are slowly released in the first front stage. Therefore, the switch from the first stage makes progress slowly, and the switch to the second stage can be carried out quickly by speeding up the releasing speed after the rear stage in which the releasing operation makes progress at a certain degree (a lower stage of FIG. 9 exemplifies an aspect of the connecting portion 134 shown in FIG. 6B). As a result, the inflated state of the air bag main body 18 can be smoothly switched near an ideal state from the first stage to the second stage via the vicinity of a boundary between the first and second stages as shown in the drawing. Here, as the other method for obtaining the characteristic that the inflation is carried out in two stages with age as shown in the drawing, there is a technique that two initiators are arranged within a gas generator, and are ignited in stages one by one, for example, as described in JP, A, 2002-274316. However, in this case, it is necessary to prepare two initiators, and control each of the initiators at different timings. On the contrary, the present embodiment has an effect that the inflation in two stages as mentioned above can be achieved only by arranging one initiator in the gas injection mechanism in the inner portion of the above described inflator main body 32 and igniting once.

Further, particularly in the present embodiment, the coupling member 90 may include a plurality of (two in the example) straps 94 provided between the front panel 70 and the rear panel 80, and each of the straps 94 includes the bent part 132 and the connecting portion 134. As a result, even in the case that a plurality of straps 94 is provided, it is possible to keep balance when the air bag main body 18 inflates.

Figure 10A:
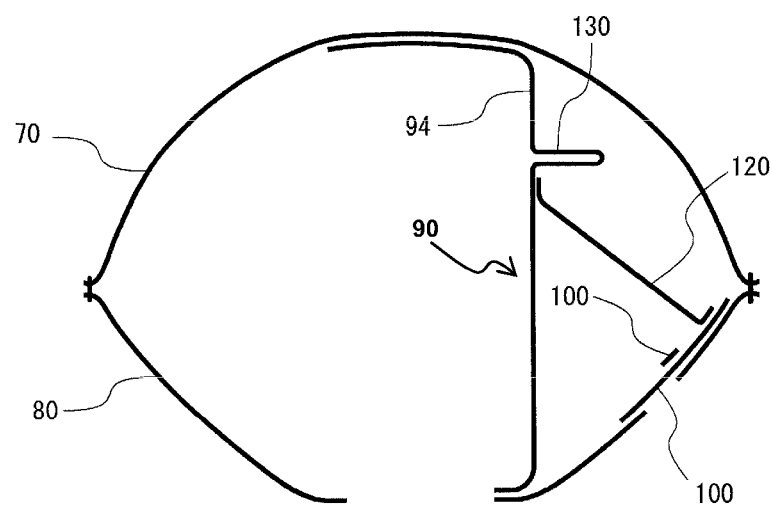
FIG. 10A is an explanatory view of an essential part of an air bag device according to a modified example of the present invention.
Figure 10B:
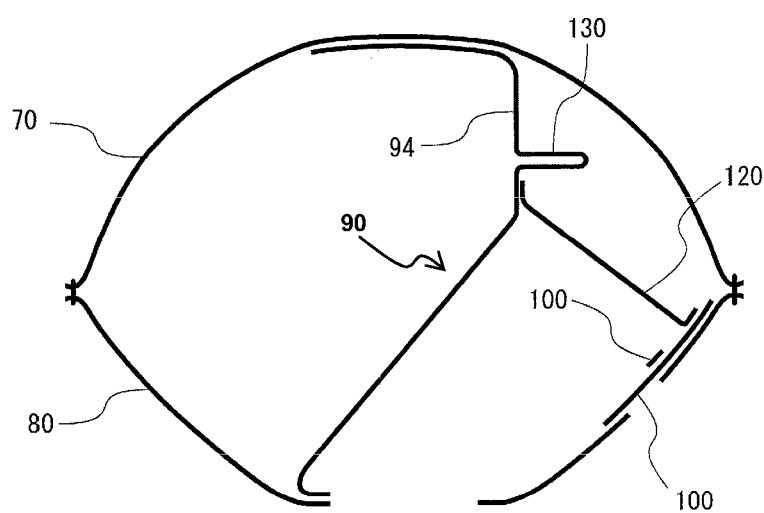
FIG. 10B is an explanatory view of an essential part of an air bag device according to a modified example of the present invention.

Note that, in the embodiment mentioned above, there is disclosed the structure in which two facing band-like straps 94 are provided, but the number and the drawing direction of the strap 94 are not particularly limited as long as the tension state in relation to the connecting member 120 can be secured in both the cases of the first stage and the second stage, for example, a cantilever strap 94A which is provided only in a side closer to the vent hole 86 as shown in FIG. 10A, and a cantilever strap 94B which is drawn to a side closer to the vent hole 86 from a side away from the vent hole 86 as shown in FIG. 10B. The same effect as mentioned above can be obtained in these cases.

Note that, the embodiment mentioned above is an example of the preferable mode according to the present invention, but the present invention is not limited to the embodiment, but can be variously modified in a range which does not deflect from the scope of the present invention.

What is claimed is:

1. An air bag comprising:
an air bag main body formed as a bag body so as to have a surface facing to an occupant and a surface opposite to the occupant in an inflated state;
a coupling member configured to couple said surface facing to the occupant and said surface opposite to the occupant inside said air bag main body;
a vent hole formed in said surface opposite to the occupant;
a lid member including one end fixed to said surface opposite to the occupant and another end supported by said surface opposite to the occupant so as to normally close said vent hole; and
a connecting member including one end fixed to said coupling member and another end fixed to the another end of said lid member, wherein
said coupling member includes:
a bent part bent at least one position of a middle portion of the coupling member; and
a connect portion configured to maintain a bent state of said bent part,
said connect portion is provided at a plurality of positions of said bent part for expanding said coupling member step by step, and
a density of arrangement of the connect portion at the plurality of positions is sparser toward a rear stage so that a connection releasing time from a front stage to the rear stage becomes quickened gradually.

2. The air bag according to claim 1, wherein
the coupling member includes a plurality of straps provided between said surface facing to the occupant and said surface opposite to the occupant, and
each of the straps includes said bent part and said connect portion.

3. An air bag device comprising:
the air bag according to claim 1; and
an inflator configured to supply pressure gas inside said air bag main body.

* * * * *